United States Patent
Mancosu et al.

(10) Patent No.: US 6,697,772 B2
(45) Date of Patent: Feb. 24, 2004

(54) METHOD FOR DETERMINING PRESELECTED PERFORMANCE CHARACTERISTICS OF A TREAD OF A TIRE

(75) Inventors: Federico Mancosu, Milan (IT); Giuseppe Matrascia, Seregno (IT); Paolo Esercitato, Vimercate (IT)

(73) Assignee: Pirelli Pneumatici S.p.A., Milan (IT)

( * ) Notice: Subject to any disclaimer, the term of this patent is extended or adjusted under 35 U.S.C. 154(b) by 214 days.

(21) Appl. No.: 09/987,645

(22) Filed: Nov. 15, 2001

(65) Prior Publication Data

US 2002/0056507 A1 May 16, 2002

Related U.S. Application Data

(62) Division of application No. 09/469,888, filed on Dec. 22, 1999, now abandoned
(60) Provisional application No. 60/113,821, filed on Dec. 23, 1998.

(30) Foreign Application Priority Data

Dec. 22, 1998 (EP) .............................................. 98204415

(51) Int. Cl.⁷ ......................... G06F 17/10; G06F 17/50
(52) U.S. Cl. ................ 703/2; 703/1; 703/8; 152/209.2; 152/209.3; 152/209.5; 152/209.15; 152/209.18; 156/110.1; 700/31
(58) Field of Search .............................. 703/1, 2, 6, 7, 703/8; 700/30, 31; 156/110.1; 152/209.1, 209.2, 209.3, 209.5, 209.15, 209.18, 902, 209.26, 454; 73/146

(56) References Cited

U.S. PATENT DOCUMENTS

| | | | | |
|---|---|---|---|---|
| 4,877,072 A | * | 10/1989 | Fontaine | 152/209.1 |
| 5,431,208 A | * | 7/1995 | Aoki et al. | 152/209.26 |
| 5,617,341 A | * | 4/1997 | Nakajima | 703/8 |
| 5,811,672 A | * | 9/1998 | Mancosu et al. | 73/146 |
| 5,824,169 A | * | 10/1998 | Landers et al. | 152/454 |
| 6,083,268 A | * | 7/2000 | Kelsey et al. | 703/7 |
| 6,230,112 B1 | * | 5/2001 | Ishiyama | 703/1 |

OTHER PUBLICATIONS

Lacombe, J. Tire Model for Simulations of Vehicle Motion on High and Low Friction Road Surfaces, Proceedings of the 2000 Winter Simulation Conference, Dec. 2000, pp. 1025–1034.*

Forbes, N. Treading New Ground, Computing in Science & Engineering, IEEE, Vol: 4, Issue: 5, Sep.–Oct. 2002, pp. 12–13.*

Pohl et al., A. The "Intelligent Tire" Utilizing Passive SAW Sensors—Measurement of Tire Friction, IEEE Transactions on Instrumentation and Measurement, Vol: 48, No:6, Dec. 1999, pp. 1041–1046.*

* cited by examiner

Primary Examiner—Russell Frejd
(74) Attorney, Agent, or Firm—Finnegan, Henderson, Farabow, Garrett & Dunner, L.L.P.

(57) ABSTRACT

A method for determining preselected performance characteristics of a tire tread includes the steps of dividing the tread into a 3-D grid of cells; dividing a tread contact area into longitudinal and transversal strips; associating a longitudinal or transversal stiffness value with each strip using a linear relationship; assigning a preselected deformation state to each longitudinal and transversal strip; determining at least one single force, associated with each strip and acting in the longitudinal or transversal direction by means of the stiffness value and the deformation state; determining at least one total force associated with each contact area by summing all single forces, the total force representing at least one of the performance characteristics; determining a pattern of the total forces of all the contact areas; and analyzing the pattern of total forces to evaluate whether they assume values that optimize at least one preselected performance characteristic of the tread.

11 Claims, 6 Drawing Sheets

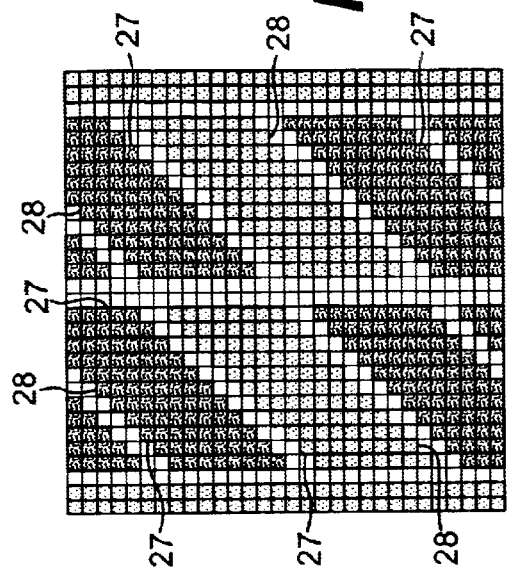
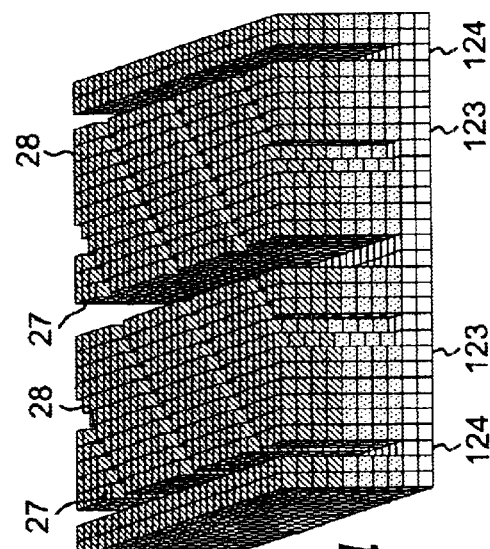
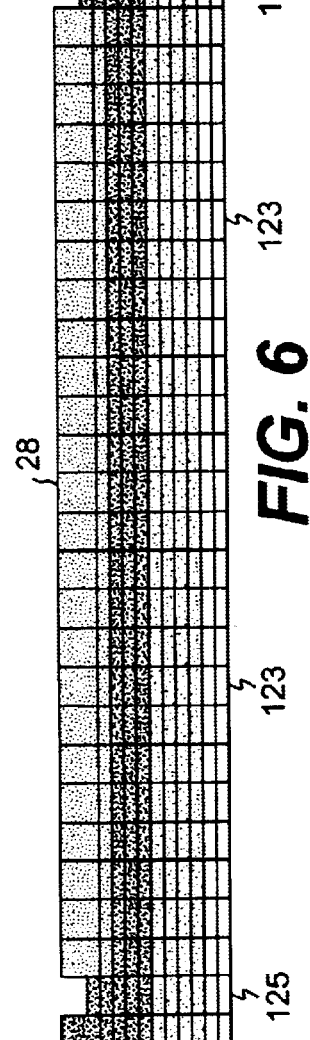
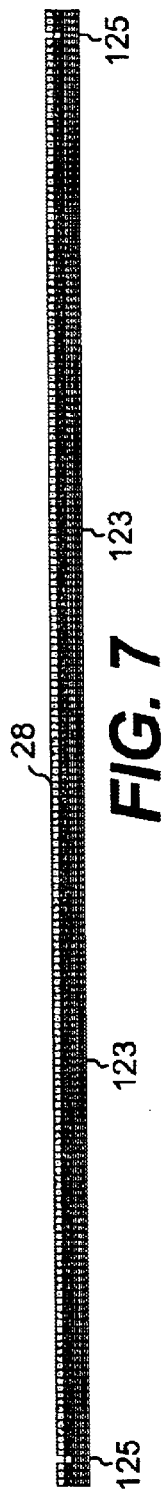
FIG. 4
FIG. 5
FIG. 6
FIG. 7

METHOD FOR DETERMINING PRESELECTED PERFORMANCE CHARACTERISTICS OF A TREAD OF A TIRE

CROSS-REFERENCE TO RELATED APPLICATION

This application is a divisional of U.S. patent application Ser. No. 09/469,888, filed Dec. 22, 1999, now abandoned, in the U.S. Patent and Trademark Office; additionally, Applicants claim the right of priority under 35 U.S.C. §119(a)–(b) based on patent application Ser. No. 98204415.8, filed Dec. 23, 1998, in the European Patent Office, further, Application claim the benefit under 35 U.S.C. §119(e) baded on prior-filed, copending provisional application No. 60/113,821, filed Dec. 23, 1998, in the U.S. Patent and Trademark Office, the contents of all of which are relied upon and incorporated herein by reference.

BACKGROUND OF THE INVENTION

Field of the Invention

This invention relates to a method for determining preselected performance characteristics of a tread of a tire, comprising ride comfort, noise and handling, and a tire provided with a tread having optimal characteristics with reference to said performance characteristics.

SUMMARY OF THE INVENTION

The subject of this invention is a method which allows to determine a set of performance characteristics of a tread of a tire by means of a single criterion which refers to all the performance characteristics taken into account.

An initial aspect of the invention is a method for determining preselected performance characteristics of a tread of a tire, comprising ride comfort, noise and handling, where a longitudinal direction (x), a transversal direction (y) and a vertical direction (z) are associated with said tread, where said tread has a preselected thickness and a preselected circumferential development and is made from a preselected rubber compound comprising blocks and grooves, each portion of said tread in contact with a road surface having a contact area, where said method comprises the following phases:

a) dividing said tread into a 3-D grid of full cells and empty cells of preselected dimensions (dxdydz), b) identifying piles of said cells in said grid, each pile of cells having a base area equal to that of one cell (dxdy) and a height (h) equal to said thickness of the tread, said piles of cells being full, empty or partially fully, c) dividing each contact area into longitudinal and transversal strips of piles of cells, with preselected dimensions in said transversal and longitudinal directions, d) counting the number of consecutive piles of full cells delimited by two piles of cells which are either partially full or empty, one preceding, the other following said consecutive piles of full cells in each strip and e) associating a transversal or longitudinal stiffness K with each strip of piles of cells by means of the following linear relationship:

$$K = m^* n$$

where n is the number of consecutive piles of full cells and m is an angular coefficient which is determined by means of the following linear relationship:

$$m = mm^* i + c$$

where mm is an angular coefficient, i is the total number of empty cells present in said two piles of cells which are either partially full or empty delimiting said consecutive piles of full cells and c is a constant, said angular coefficient mm and constant c both depending on the number n of consecutive piles of full cells, f) assigning a preselected deformation state to each transversal and longitudinal strip of piles of cells, g) determining at least one single force F, associated with each strip of piles of cells and acting in one of transversal (y) and longitudinal (x) directions by means of said stiffness value K and said deformation state, h) determining at least one total force $F^r$ associated with each contact area and acting in one of transversal (y) and longitudinal (x) said directions by summing all the single forces associated with all the transversal and longitudinal strips of piles of cells of said contact area, said total force representing at least one of said performance characteristics, i) determining the pattern of the total forces $F_t$ associated with all the contact areas along said circumferential development of the tread and j) analysing said pattern of total forces $F_t$ to evaluate whether said total forces assume values such as to optimize at least one preselected performance characteristic of said tread.

According to one embodiment:

k) in said step c), each contact area is divided into transversal strips of piles of cells with dimensions dx ly h, where dx is the length of a cell in said longitudinal direction (x), ly is the width of said strip in said transversal direction (y), measured in a preselected position in said longitudinal direction (x) and delimited by portions of the contour line of the contact area, and h is the thickness of said tread, l) in said step e), a transversal stiffness $K_y$ is associated with each transversal strip of piles of cells, m) in said step g), a single transversal force $F_y = K_y^* y$ is associated with each transversal strip, n) in said step h), a total transversal force $F_{yt}$ is associated with each contact area and o) in said step i), a pattern of the total transversal forces $F_{yt}$ is obtained for the entire circumferential development of the tread and in said step j) the values assumed by said total transversal forces are evaluated to check whether they have a mean value higher than a preselected limit and a variance lower than a preselected limit to optimize said tread with reference to handling.

According to another embodiment:

p) in said step c), each contact area is divided into longitudinal strips of piles of cells with dimensions dy lx h, where dy is the width of a cell in said transversal direction (y), lx is the length of said strip in said longitudinal direction (x), measured in a preselected position in said transversal direction (y) and delimited by portions of the contour line of the contact area, and h is the thickness of said tread, q) in said step e), a longitudinal stiffness $K_x$, is associated with each longitudinal strip of piles of cells and r) in said step g), a single longitudinal force $F_x = K_x^* x$ is associated with each longitudinal strip, s) in said step h), a total longitudinal force $F_{xt}$ is associated with each contact area and t) in said step i), a pattern of the total longitudinal forces $F_{xt}$ is obtained for the entire circumferential development of the tread and in said step j) the values assumed by said total longitudinal forces are evaluated to check whether they have a mean value and variance lower than preselected limits to minimize the noise output by said tread and optimize ride comfort.

Preferably, said method also comprises the following phase:

u) associating a total transversal stiffness $K_{yt}$ to each contact area by summing the transversal stiffness values $K_y$ associated with all transversal strips in said contact area.

Advantageously, said method also comprises the following phase:

v) associating a total longitudinal stiffness $K_{xt}$ to each contact area by summing the longitudinal stiffness values $K_x$ associated with all longitudinal strips in said contact area.

Preferably, the value of said stiffness $K_{xt}$ is in the range from 2300 to 2500 N/mm and the value of said stiffness $K_{yt}$ is in the range from 2400 to 2600 N/mm.

In turn, the ratio of said stiffness values $K_{yt}$ and $K_{xt}$ is preferably as follows:

$$K_{yt}/K_{xt}=0.98 \div 1.05.$$

The method according to this invention has the advantage of being simple and very reliable.

A second aspect of this invention relates to a tire provided with a tread having optimal characteristics as regards preselected performance characteristics, comprising ride comfort, noise and handling, where a longitudinal direction (x), a transversal direction (y) and a vertical direction (z) are associated with said tread, where said tread has a preselected thickness and a preselected circumferential development and is made from a preselected rubber compound and comprises blocks and grooves, each portion of said tread in contact with a road surface having a contact area, where said tread is divisible into a 3-D grid of full cells and empty cells of preselected dimensions (dxdydz), where in said grid piles of said cells are identified, each pile of cells having a base area equal to that of one cell (dxdy) and height (h) equal to said thickness of the tread, said piles of cells being full, empty and partially full, where each contact area is divided into transversal and longitudinal strips of piles of cells having preselected dimensions in said transversal and longitudinal directions, where each strip of piles of cells comprises consecutive piles of full cells delimited by two piles of partially full or empty cells, one preceding and the other following said consecutive piles of full cells, where a transversal or longitudinal stiffness K is associated with each strip of piles of cells which is linearly linked to the number n of said consecutive piles of full cells by means of an angular coefficient m, said angular coefficient m being, in turn, linearly linked—by means of an angular coefficient mm—to the total number i of empty cells in two piles of partially full or empty cells which delimit said consecutive piles of full cells, except for a constant c, said angular coefficient mm and constant c both depending on the number n of consecutive piles of full cells, where a single force F acting in one of said transversal (y) and longitudinal (x) directions is associated with each transversal and longitudinal strip of piles of cells, said force F depending on said stiffness K and a preselected state of deformation of said strip of piles of cells, where at least one total force $F_t$, consisting of the sum of all the single forces associated with all the transversal or longitudinal strips of piles of cells of said contact area, is associated with each contact area, said total force representing at least one of said performance characteristics, where said full and empty cells have an arrangement which is substantially uniform along the circumferential development of said tread and generates total forces associated with all the contact areas of all the portions of said tread in contact during one entire revolution, having values substantially equal and constant so to optimize at least one preselected performance characteristic of said tread.

According to an embodiment, each contact area is divisible into transversal strips of piles of cells with dimensions dx ly h, where dx is the length of a cell in said longitudinal direction (x), ly is the width of said strip in said transverse direction (y), measured in a preselected position in said longitudinal direction (x) and delimited by portions of the contour line of the contact area, and h is the thickness of said tread, a transversal stiffness $K_y$ and a single transversal force $F_y=K_y*y$ being associated with each transversal strip of piles of cells, a total transversal force $F_{yt}$ being associated with each contact area, said total transversal force $F_{yt}$ resulting from the summation of all the single forces $F_y$ associated with all the transversal strips of said contact area, said total transversal forces $F_{yt}$ having a mean value higher than a preselected limit and a variance lower than a preselected limit to optimize said tread with reference to handling.

According to another embodiment, each contact area is divisible into longitudinal strips of piles of cells with dimensions dy lx h, where dy is the width of a cell in said transversal direction (y), lx is the length of said strip in said longitudinal direction (x), measured in a preselected position in said transversal direction (y) and delimited by portions of the contour line of the contact area, and h is the thickness of said tread, a longitudinal stiffness $K_x$ and a single longitudinal force $F_x=K_x*x$ being associated with each longitudinal strip of piles of cells, a total longitudinal force $F_{xt}$ being associated with each contact area, said total longitudinal force $F_{xt}$ resulting from the summation of all the single forces $F_x$ associated with all the longitudinal strips of said contact area, said total longitudinal forces $F_{xt}$ having a mean value and a variance lower than preselected limits to minimize the noise output by said tread and optimize ride comfort.

Preferably, a total transversal stiffness value $K_{yt}$ is associated with each contact area by summing the transversal stiffness values $K_y$ associated with all transversal strips in said contact area.

Advantageously, a total longitudinal stiffness value $K_{xt}$ is associated with each contact area by summing the longitudinal stiffness values $K_x$ associated with all longitudinal strips in said contact area.

Preferably, said stiffness values $K_{xt}$ and $K_{yt}$, have the aforementioned values.

In turn, the ratio between said stiffness values $K_{yt}$ and $K_{xt}$ has the aforementioned values.

Advantageously, said tread has—for a modulus of elasticity of shear G equal to 1—the following stiffness values $K_{xt}$, and $K_{yt}$:

$$K_{xt}=2345 \ N/mm$$

$$K_{yt}=2412 \ N/mm.$$

In this particular case, the ratio between said stiffness values $K_{yt}$ and $K_{xt}$ is as follows:

$$K_{yt}/K_{xt}=1.03.$$

A third aspect of this invention relates to a tire with a tread having optimal characteristics as regards preselected performance characteristics, comprising ride comfort, noise and handling, where a longitudinal direction (x), a transversal direction (y) and a vertical direction (z) are associated with said tread, where said tread has a preselected thickness and a preselected circumferential development and is made from a preselected rubber compound and comprises blocks and grooves, each portion of said tread in contact with a road surface having a contact area, where a total longitudinal stiffness value $K_{xt}$ and a total transversal stiffness value $K_{yt}$ are associated with each contact area, said stiffness values $K_{xt}$ and $K_{yt}$ having the following values:

$$K_{xt}=2300 \div 2500 \text{ N/mm}$$

$$K_{yt}=2400 \div 2600 \text{ N/mm}.$$

Preferably, the ratio between said stiffness values $K_{yt}$ and $K_{xt}$ is as follows:

$$K_{yt}/K_{xt}=0.98 \div 1.05.$$

Advantageously, said tread has—for a modulus of elasticity of shear G equal to 1—the following stiffness values $K_{xt}$, and $K_{yt}$:

$$K_{xt}=2345 \text{ N/mm}$$

$$K_{yt}=2412 \text{ N/mm}.$$

Moreover, the ratio between said stiffness values $K_{yt}$ and $K_{xt}$ is as follows:

$$K_{yt}/K_{xt}=1.03.$$

A fourth aspect of this invention relates to a tire with a tread having optimal characteristics as regards preselected performance characteristics, comprising ride comfort, noise and handling, said tread having an arrangement of full cells and empty cells which is substantially uniform and equal throughout the contact areas along the circumferential development of said tread.

A fifth aspect of this invention relates to a method for determining preselected performance characteristics of a tread of a tire, comprising ride comfort, noise and handling, said method comprising the following phases:

determining, for each new tread pattern, various types of transversal and longitudinal strips of piles of cells in a contact area;

determining the angular coefficient m for each type of strip, on the basis of the number of empty cells (i) in two piles of cells which delimit it (FIG. 10);

subsequently, determining the stiffness K on the basis of the number of consecutive piles of full cells (n) in said strip (FIG. 8 or FIG. 9) and then determining a force F associated with each strip according to the modulus of elasticity G of the type of compound used for said tread.

The method and the tire according to this invention are based on a "full and empty" evaluation criteria (full cells and empty cells) in the contact area of the tread. The contact area is divided into 3-D cells (full and empty) with dimensions dx dy dz. The cells are grouped into piles of full, empty and partially full cells with dimensions dx dy h. The piles of cells are, in turn, grouped into transversal strips (direction y) with dimensions dx ly h and longitudinal strips (direction x) with dimensions dy lx h. The corresponding transversal or longitudinal stiffness is associated with each transversal and longitudinal strip by means of the linear equations: $K=m*n$. The straight lines depend on the type of pile (partially full or empty) which, respectively, precedes and follows the group consecutive piles of full cells in the strip. The angular coefficients mm of these straight lines, in turn, are on a straight line which binds them to the total number i of empty cells in the two piles which delimit the groups of consecutive piles of full cells. The corresponding transversal force $F_y=K_y*y$ or longitudinal force $F_x=K_x*x$ is determined by applying a, for example triangular, shearing deformation state to each transversal or longitudinal strip i.e. null deformation at the start of the contact area and maximum at the end of the contact area, in the transversal or longitudinal direction. The sum of all the transversal forces and—respectively—of all the longitudinal forces associated with the transversal and longitudinal strips of piles of cells in the contact area respectively provides the total transversal force and the total longitudinal force corresponding to a position of the contact area. The pattern of the total transversal and longitudinal forces is then determined for all the contact areas identified in the circumferential development of the tread and the spectrum thereof is calculated to evaluate whether the values are such to optimize performance characteristics, such as comfort, noise and handling.

The ride comfort and the noise output by the tread—in particular the output "signal volume"—are optimized by controlling the longitudinal force.

The expression "signal volume" is herein used to indicate the intensity of the noise output by the tread, i.e. the absolute noise volume.

Ride comfort is optimized by minimizing the longitudinal force generated by the tread during tire rolling on any type of road surface (consequently, including irregularities of the road surface and/or isolated obstacles, i.e. manhole covers, tram tracks, etc.). In particular, the harmonic components of the longitudinal force—involving frequencies between 0 and 150 Hz—are considered.

In turn, the noise output by the tread when rolling is minimized by means of an optimal pattern of longitudinal stiffness of the tread in its circumferential development, i.e. by means of a longitudinal force with a low mean value and limited oscillations around this value. This allows to reduce the "volume" of the output noise (with equal modulus of elasticity G of the tread compound). In this case, the harmonic components of the longitudinal force involve frequencies higher than 150 Hz.

The noise output by the tire when cornering, i.e. in conditions involving leaning and vertical load transfer, is minimized taking into account the variations in length of the contact area with the vertical load. In other words, both the variations of the contact area along the circumferential development and the variations in the contact area due to rapid variations of the vertical load are taken into account.

The method according to this invention also allows to determine the slip angle (force) of the tread of a tire when cornering and the transversal stiffness of the tire. Also in this case, a brush model, known to engineers expert in the field, is used and a triangular transversal shearing (deformation is imposed) on the contact area.

Handling is optimized—as concerns the contribution of the tread to the slip angle—by means of a high transversal stiffness of the tread involved in the contact. This is obtained by controlling the transversal stiffness $K_{yt}$ of the tread.

The method according to this invention also allows to predetermine the torsional stiffness of the tread using the transversal stiffness value $K_y$ and the longitudinal stiffness value $K_x$, of the strips of piles of cells. The total torque $C_{kt}$ generated by a rotation imposed on the contact area is determined. The ratio between the torque and the rotation is the total torsional stiffness $K_{tt}$ of the tread under contact.

A high torsional stiffness of the tread allows to additionally optimize handling. This is attained by controlling the lateral and longitudinal stiffness values and by the geometrical position of these stiffness values (i.e. of the cell of the tread to which these stiffness values refer) in the contact area.

Consequently, the type of full and empty elements allows to control the variations of longitudinal, transversal and torsional stiffness during tire rolling. These variations of stiffness influence the performance of the tire with respect to a vehicle (vibrations, handling) and the external environment (vibrations, noise).

BRIEF DESCRIPTION OF THE DRAWINGS

Characteristics and advantages of this invention will now be illustrated with reference to an embodiment represented as a non-limiting example in the enclosed drawings, wherein:

FIG. 4 schematically illustrates (partial perspective view, enlarged scale) two rows of blocks of a tread used to calculate the equations: K=m*n and m=mm*i+c;

FIG. 5 is a view from above of the rows of blocks mentioned in FIG. 4;

FIGS. 6 and 7 illustrate (frontal view, enlarged scale) strips of piles of cells of the tread used to calculate the aforesaid equations;

DETAILED DESCRIPTION OF THE PREFERRED EMBODIMENTS

Figure 1:
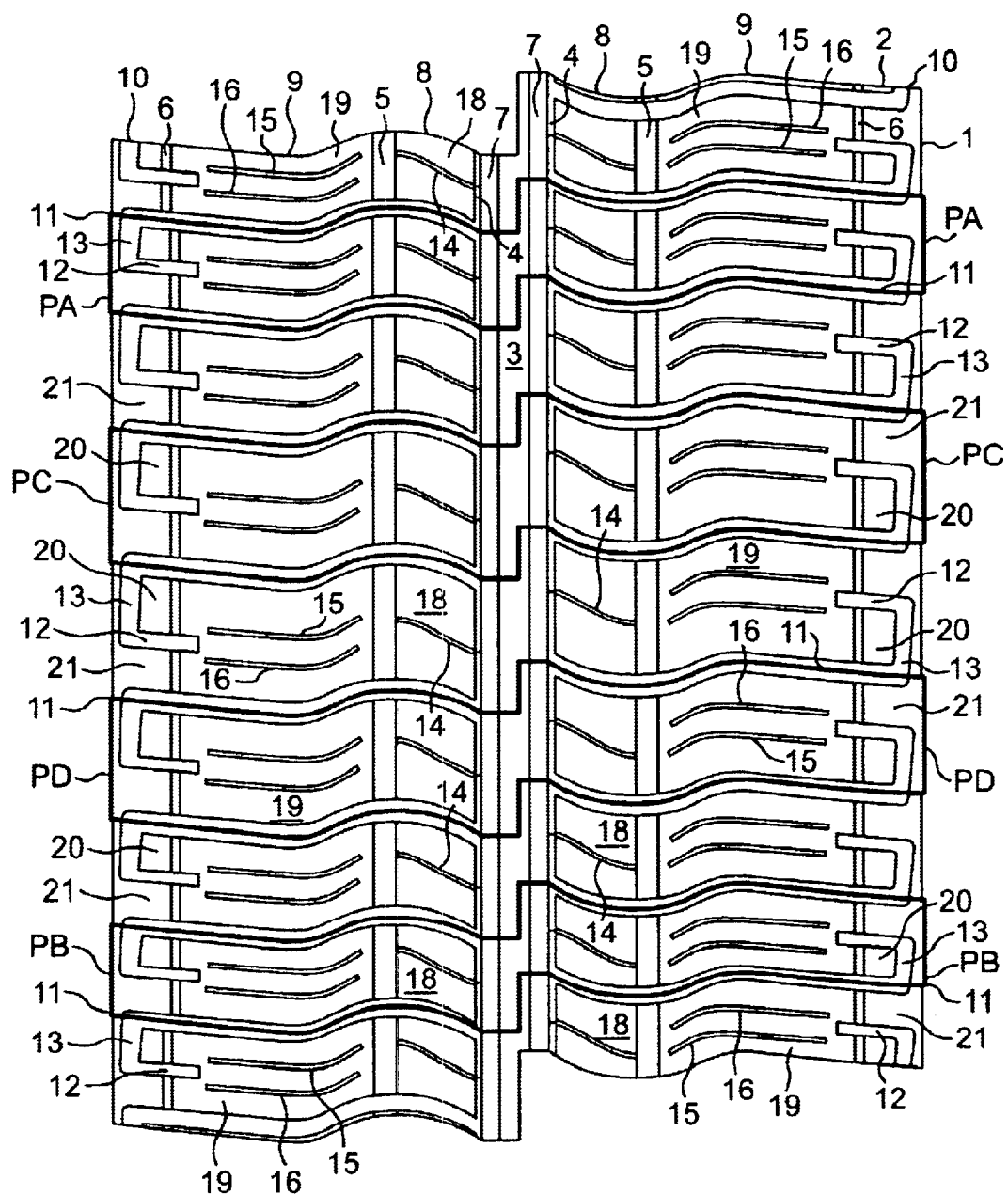
FIG. 1 is a partial view (plan view) of a tread of a tire, according to this invention.
Figures 2, 3:
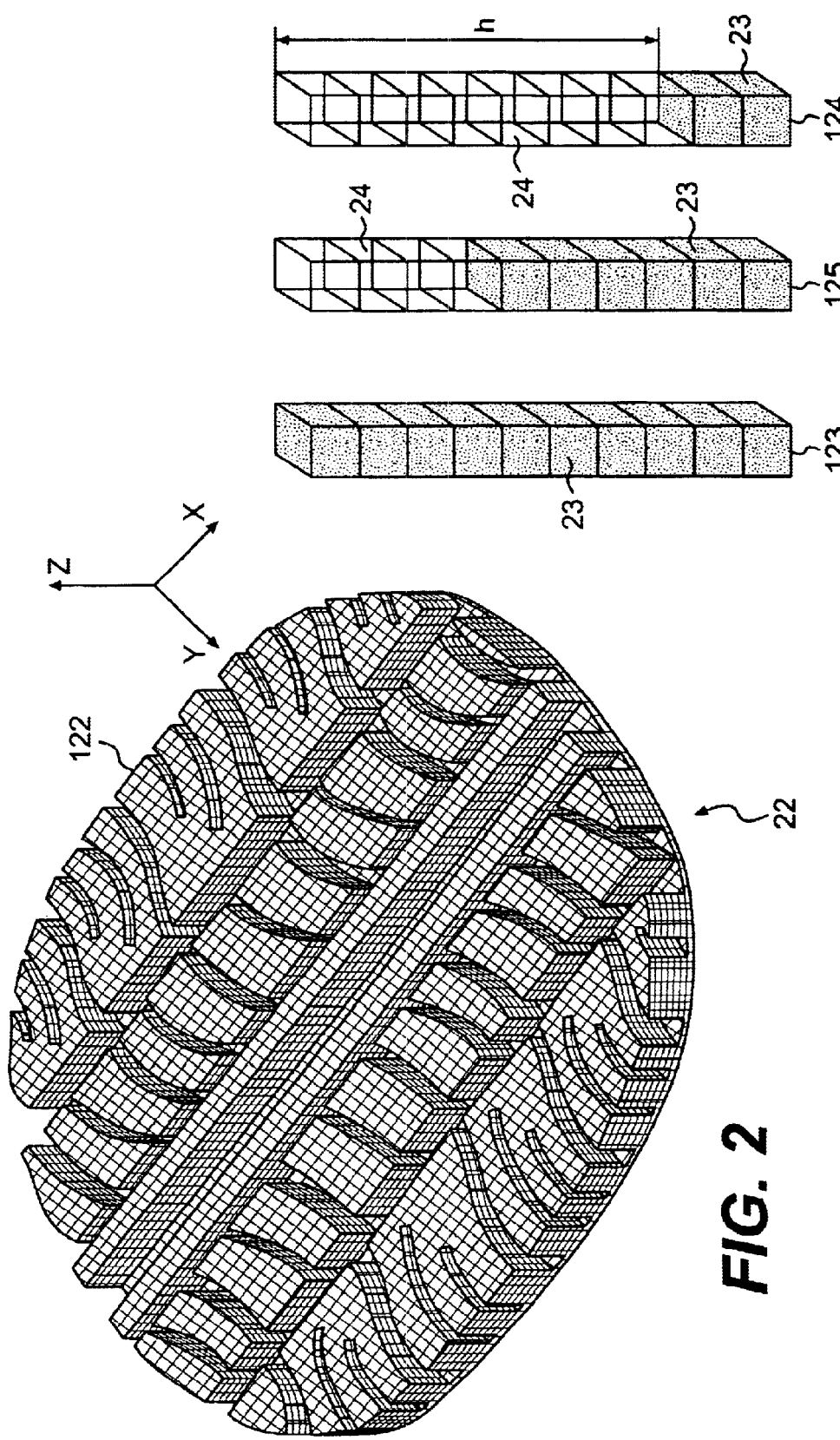
FIG. 2 is a perspective view (enlarged scale) of a portion of the tread illustrated in FIG. 1 with a given contact area.
FIG. 3 illustrates (enlarged scale) piles of cells of the portion of the tread illustrated in FIG. 2.

FIGS. 1 and 2 illustrate a tread 1 of a vehicle tire 2 with an optimized pattern for ride comfort, noise and handling according to this invention. The tire carcass has a standard structure (not shown). The tire size is 175/65 R 14 and tread marking is TREAD C.

Tread 1 has a central longitudinal groove 3 (which extends in the direction of movement of the tire, or circumferential sense, direction x in FIG. 2) and lateral longitudinal grooves 4, 5 and 6, to the left and to the right, i.e. located to the left and to the right of groove 3. Tread 1 also has transversal grooves 11 (which extend substantially in direction y in FIG. 2) and portions of transversal grooves 12, to the left and to the right, connected by portions of longitudinal grooves 13. The groove 3 and each groove 4 delimit a circumferential rib 7. Each pair of longitudinal grooves 4 and 5, to the left and to the right, and the transversal grooves 11 delimit an internal central row 8 of blocks 18. Each pair of longitudinal grooves 5 and 6, to the left and to the right, the transversal grooves 11 and the portions of transversal grooves 12 delimit an external central row 9 of blocks 19 (between centre and shoulder). Each groove 6, to the left and to the right, the portions of longitudinal grooves 13, the transversal grooves 11 and the portions of transversal grooves 12 delimit a shoulder row 10 of blocks 20 and 21 (FIGS. 1–4). Each block 18 has a transversal sipe 14 and each block 19 has two transversal sipes 15 and 16. Blocks 18, 19, 20 and 21 in rows 8, 9 and 10 on the left (associated with the left-hand shoulder) and on the right (associated with the right-hand shoulder) are staggered with respect to a longitudinal axis of the centreline of tread 1. In practice, each block in a right-hand row is obtained by turning the corresponding left-hand block by 180° around an axis in the plane of the sheet passing through the centreline of groove 3. The resulting block is then reversed by 180° with respect to an axis in the plane of the sheet perpendicular to the axis of the centreline of groove 3.

The pattern of the tread 1 has different pitch values $p_A$, $p_B$, $p_C$ and $p_D$ (each pitch represents the length—in the circumferential direction—of a block and of two adjacent transversal half grooves, in particular, a block 18 and two half grooves 11). The four pitches $p_A$, $p_B$, $p_C$ and $p_D$ are arranged along the circumferential development of the tread according to a preselected sequence. The pitch sequence is made according to the invention described in U.S. Pat. No. 5,371,685 in order to modulate the noise output by the tire and, in particular, to avoid a siren effect (the presence of a single frequency).

A portion of tread 1 in contact with a road surface has a contact area 22 (FIG. 2) corresponding to a given vertical load and a fixed inflation pressure. Different contact areas result from different vertical loads and different inflation pressures.

According to the method of this invention, the tread in its entire circumferential development is divided into a grid of full and empty 3-D cells 23 and 24 of preselected dimensions (dxdydz) (FIGS. 2 and 3). The cells are grouped in vertical piles (direction z in FIG. 2), i.e. piles of full, empty and partially full cells, 123, 124 and 125 respectively, with a base of two full cells which form the background of the tread. Each portion of tread under the contact area 22 has a group of piles of cells, as illustrated in FIG. 2. The cells have, for example, unitary dimensions of 1.1 mm per side and a volume of 1.1×1.1×1.1 $mm^3$. The height of the piles of cells is equal to the thickness of the tread and is considered constant, e.g. 10 mm.

In each contact area 22, the piles of cells are grouped in transversal strips (direction y) 27 and longitudinal strips 28 (direction x) (FIGS. 4 and 5). The transversal strips 27 have dimensions dx ly h, where dx is the length of a cell in the longitudinal direction (x), ly is the width of a strip delimited by portions of the contour line 122 of the contact area, in the transversal direction (y), measured in a preselected position in the longitudinal direction (x) and h is the thickness of the tread. The longitudinal strips 28 have dimensions dy lx h, where dy is the width of a cell in the transversal direction (y), lx is the length of a strip delimited by portions of the contour line 122 of the contact area, in the longitudinal direction (x), measured in a preselected position in the transversal direction (y) and h is the thickness of the tread.

The tread illustrated in FIGS. 4 and 5 has two rows of blocks divided into transversal 27 and longitudinal 28 strips of piles of cells and is used to calculate the equations: K=m*n and m=mm*i+c, as illustrated below.

FIGS. 6 and 7 illustrate two strips 28 of piles of cells of the tread used to calculate the aforesaid equations. A strip 28 (FIG. 6) is formed by a row of 25 consecutive piles of full cells 123 and by two end piles of partially full cells 125. The two piles of partially full cells delimit the consecutive piles of full cells, one preceding the piles of full cells and the other following them. The other strip 28 (FIG. 7) is formed by a row of 200 consecutive piles of full cells 123 and by two end piles of partially full cells 125, one preceding the pile of full consecutive cells and the other following them.

The transversal strips 27 of piles of cells of the tread have a configuration similar to that of the longitudinal strips 28.

The stiffness K of the single longitudinal or transversal strips of piles of cells is determined by means of the following linear equation:

$$K=m*n \qquad (1)$$

where n=number of consecutive piles of full cells forming the strip being examined, and m=angular coefficient which is determined, in turn, by means of the following linear equation:

$$m=mm*i+c \qquad (2)$$

where
- mm=angular coefficient which depends on the number n of consecutive piles of full cells,
- i=total number of empty cells (recess depth) present in the two piles of partially full cells which delimit the consecutive piles of full cells and
- c=constant (straight line interception point) which depends on the number n of consecutive piles of full cells.

Figure 8:
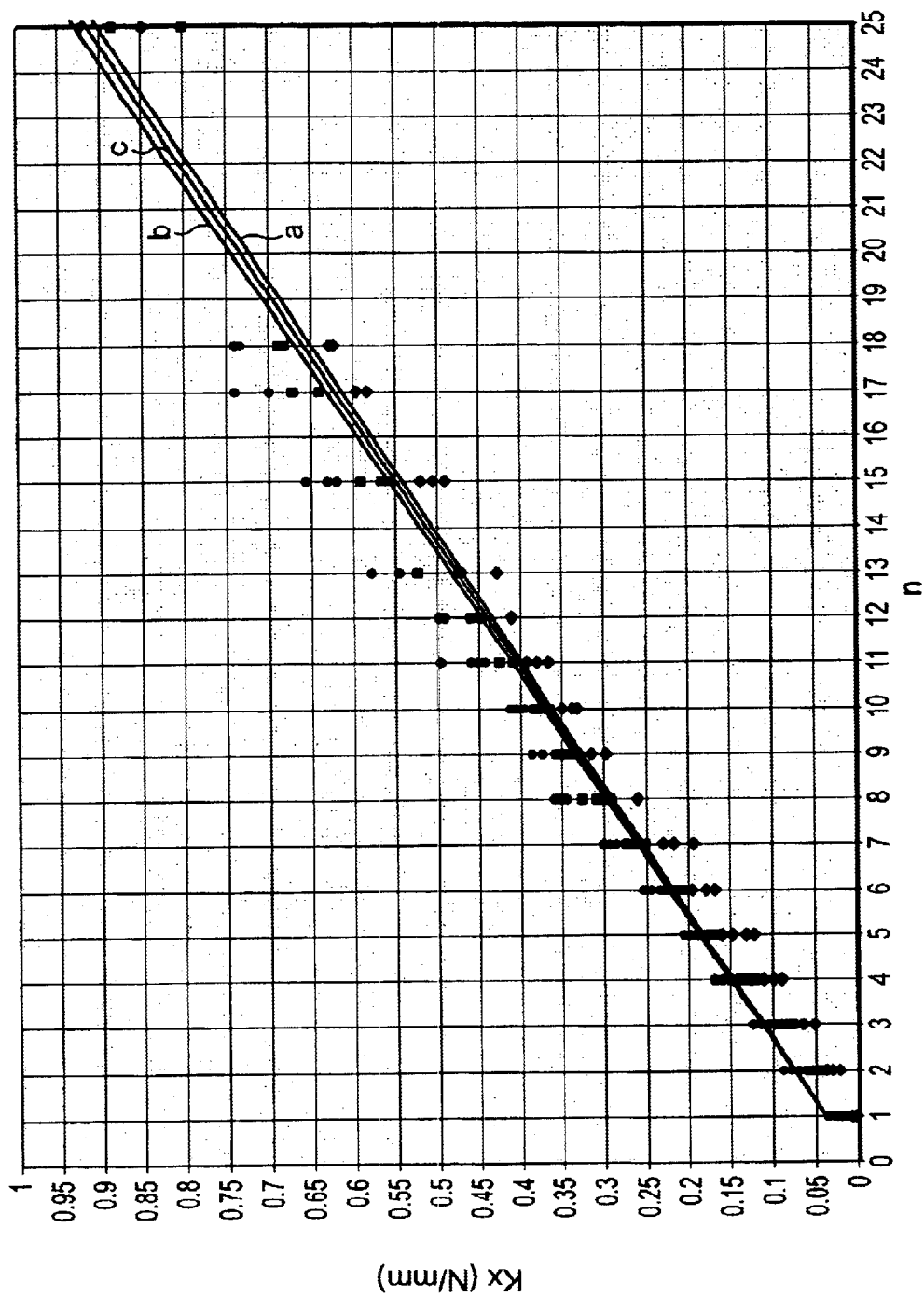
FIGS. 8 and 9 are graphs which illustrate the linear pattern of the longitudinal stiffness $K_x$ of strips of piles of cells of the tread illustrated in FIG. 4 according to the number of consecutive piles of full cells in a strip.

FIG. 8 illustrates three straight lines a, b and c which represent the pattern of the longitudinal stiffness $K_x$ according to the number n of full consecutive cells for three types of longitudinal strips comprising up to 25 consecutive piles of full cells. The straight lines a, b and c were determined by interpolating the points representing the stiffness values. The stiffness values, in turn, are obtained—once only—by means of the Finite Element calculation method described in the European Patent application entitled "Method for determining preselected performance characteristics of the tread of a tire and tire with a tread having optimal characteristics with reference to said performance characteristics" submitted on this same date by the Applicant. The straight line a relates to strips where the two end piles of cells comprise 8 empty cells (recess depth) and has the following equation: $K_x=0.0359*n$ ($R^2=0.9983$; where $R^2$ is a coefficient of correlation, indicating value quality: the quality of the values increases when the value of $R^2$ approaches 1). The straight line b relates to strips where the two end piles of cells comprise 4 empty cells and has the following equation: $K_x=0.0371*n$ ($R^2=0.9984$). The straight line c relates to strips where one of the two end piles of cells comprises 4 empty cells and the other 8 empty cells has the following equation: $K_x=0.0365*n$ ($R^2=0.9996$).

Figure 9:
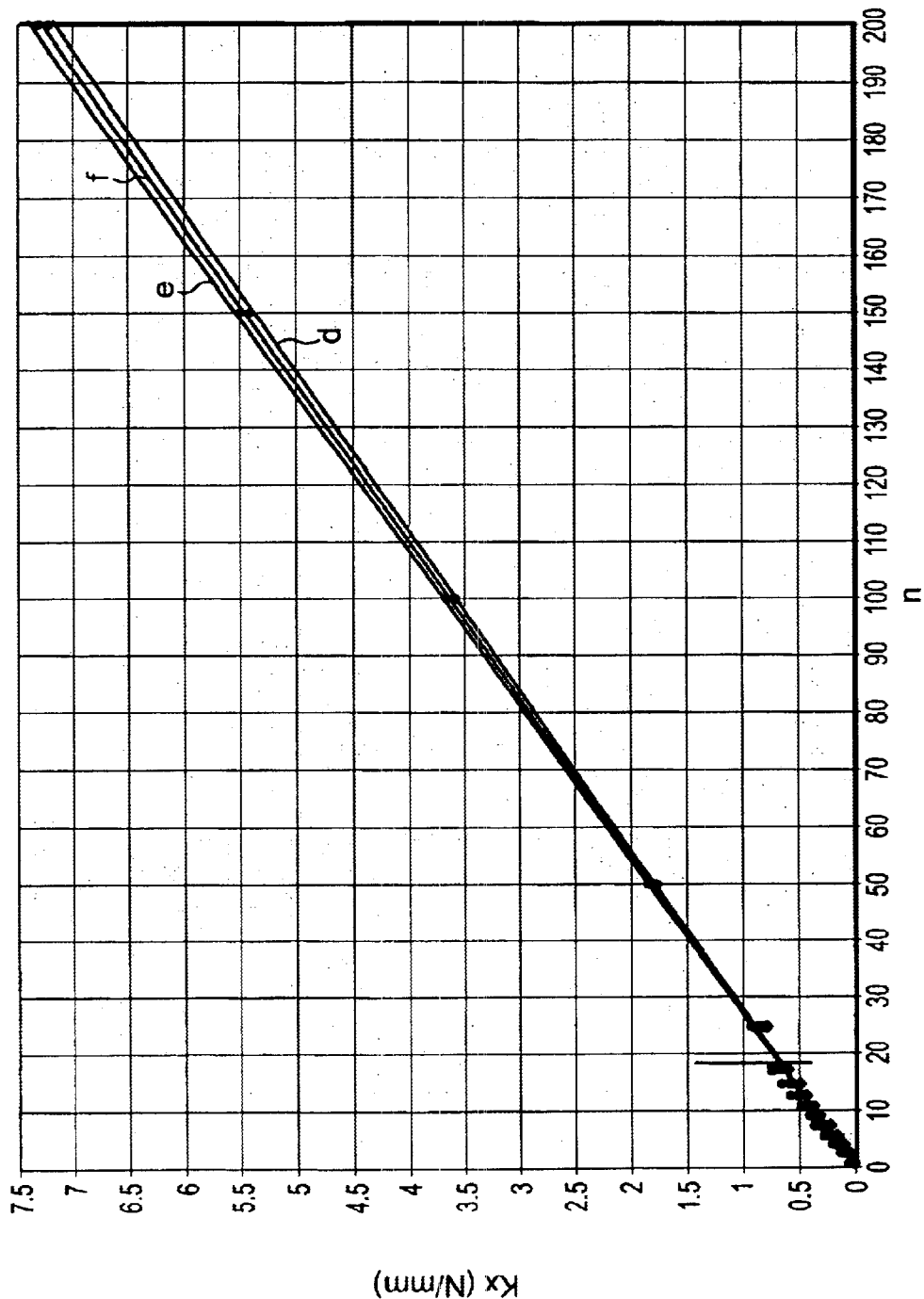

FIG. 9 illustrates three straight lines d, e and f which represent the pattern of the longitudinal stiffness $K_x$ according to the number n of piles of full consecutive cells for three types of longitudinal strips comprising up to 200 consecutive piles of full cells. Straight lines d, e and f were also determined by interpolating points providing the stiffness values attained by means of the Finite Element calculation method described in the aforesaid European Patent application submitted by the Applicant on this same date. The straight line d relates to strips where the two end piles of cells comprise 8 empty cells (recess depth) and has the equation: $K_x=0.0359*n$, as straight line a illustrated in FIG. 8. The straigt line e relates to strips where the two end piles of cells comprise 4 empty cells and has the following equation: $K_x=0.0371*n$, as straight line b illustrated in FIG. 8. The straight line f relates to strips where one of the two end piles of cells comprises 4 empty cells and the other 8 empty cells and has the following equation: $K_x=0.0365*n$, as straight line c illustrated in FIG. 8.

Figure 10:
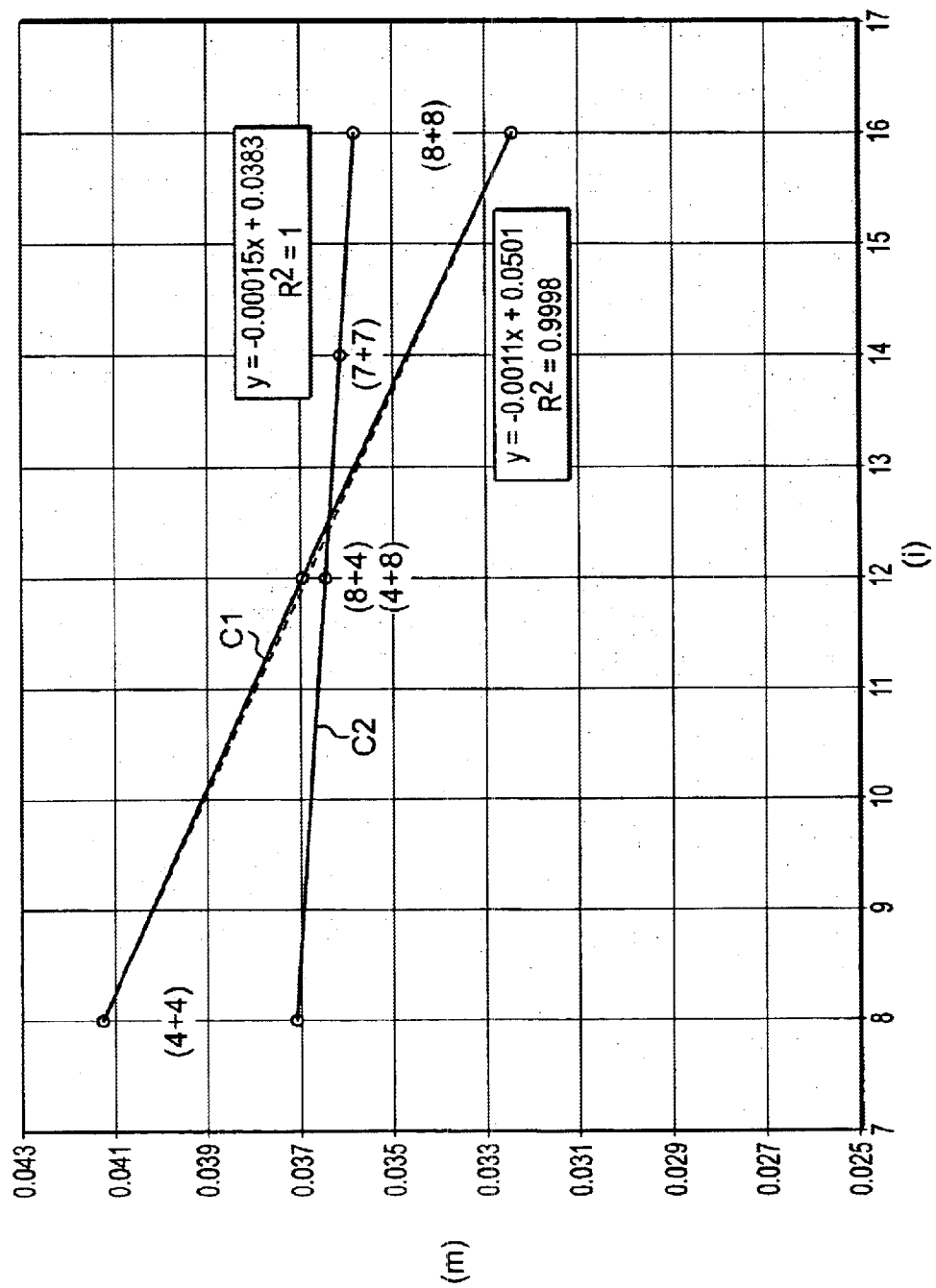
FIG. 10 is a graph which illustrates the pattern of the angular coefficient of the straight lines in the graphs illustrated in FIGS. 8 and 9.

FIG. 10 illustrates two straight lines c1 and c2 which represent the pattern of the angular coefficient m as a function of the number i of empty cells present in the piles of partially full cells which delimit the consecutive piles of full cells in each strip. The straight lines c1 and c2 were determined by interpolating the points in the graphs illustrated in FIGS. 8 and 9 and obtained, in turn, by means of the Finite Element calculation method, as mentioned above. The straight line c1 relates to strips comprising up to 18 consecutive piles of full cells and has the following equation: $m=-0.0011*i+0.0501$ ($R^2=0.9998$). The straight line c2 relates to strips comprising up to 200 consecutive piles of full cells and has the following equation: $m=-0.00015*i+0.0383$ ($R^2=1$).

It is important to note that the stiffness of the single piles of cells in a strip, formed for example by ten piles, is different from the stiffness of the single piles of cells of an other strip—again formed by ten piles—positioned in a different area of the cell grid of the tread. The sum of the stiffness values of the single piles of cells of the strip is however constant.

The total longitudinal stiffness value $K_{xt}$ and the total lateral stiffness value $K_{yt}$ were determined for the portion of tread 1 under the contact area 22 (FIG. 2) comprising cells of unitary dimensions equal to 1.1×1.1×1.1 mm³, with a modulus of elasticity G=1N/mm².

To account for the modulus of elasticity G of the compound of the tread, the value G=1 initially used in then replaced with the actual value of the modulus of elasticity of the compound.

A triangular deformation state (deformation which is null at the start of the contact area and maximum at the end of the contact area) is imposed in the transversal direction on each transversal strip after determining the transversal stiffness values $K_y$ for all the transversal strips of piles of cells in a portion of tread under a contact area. Consequently, the corresponding force $F_y$ is determined by means of the following equation:

$$F_y=K_y*y \text{ (force=stiffness*imposed slip)} \quad (3)$$

The sum of all the transversal forces associated with all the transversal strips of piles of cells in the contact area provides the total transversal force $F_{yt}$ corresponding to a position of the contact area in the circumferential development of the tread pattern.

Similarly, a triangular deformation state is imposed in the longitudinal direction on each longitudinal strip after determining the longitudinal stiffness values $K_x$ for all the longitudinal strips of piles of cells in a portion of tread under the contact area. Consequently, the corresponding force $F_x$ is determined by means of the following equation:

$$F_x=K_x*x \quad (4)$$

The sum of all the longitudinal forces associated with all the longitudinal strips of piles of cells in the contact area provides the total longitudinal force $F_{xt}$ corresponding to the position of the contact area in the circumferential development of the tread pattern.

The total transversal and longitudinal forces are then determined for all the positions of the contact area along the circumferential development of the tread. The pattern of the total transversal and longitudinal forces is then analysed to determine the mean value of the force and its variance.

Furthermore, the total transversal stiffness $K_{yt}$ and the total longitudinal stiffness $K_{xt}$ of the contact area are determined, respectively, by summing all the stiffness values $K_y$ of the transversal strips present in the contact area and all the stiffness values $K_x$ of the longitudinal strips present in the contact area.

The sum of the total transversal and longitudinal forces for an entire revolution of the tire (different positions of the contact area in the tread sequence) provides the pattern in time (or space according to the travel speed) of the transversal and longitudinal force generated by the tread and applied to a hub of a wheel of the vehicle.

To summarize, the graphs illustrated in FIGS. 8, 9 and 10 are employed for each new tread pattern, according to the method of this invention. The method simply comprises:
- determining the different types of transversal and longitudinal strips of piles of cells in the contact area,
- determining the angular coefficient m in the equation K (stiffness)=m*n for each type of strip on the basis of the number i of empty cells in the two piles of cells which delimit it (FIG. 10),
- subsequently, determining the stiffness K on the basis of the number n of consecutive piles of full cells in said strip (FIG. 8 or FIG. 9) and then determining a force F associated with each strip according to the modulus of elasticity G of the type of compound used.

The method according to this invention allows to determine an arrangement of full and empty cells—or full and empty element mapping—in the tread pattern throughout its circumferential development which optimizes ride comfort, noise and handling.

The ride comfort and noise performance characteristics are optimized by controlling the longitudinal force as an absolute value and its oscillation around the mean value during tire rolling as the portion of tread under contact varies. In particular, the variations of longitudinal force of a tire revolution are contained within a predefined field around a low mean value. This entails a low longitudinal force value transmitted to the carcass of the tire and, consequently, to the wheel hub by the tread.

Handling performance of the tire is optimized by means of an arrangement of full elements and empty elements in the tread pattern which allows to obtain high transversal stiffness values of the tread and of the slip angle (transversal force) of the tread of the tire when cornering. In practice, the arrangement of transversal stiffness in the tread is controlled, thus maximising the values to so attain a high lateral thrust for cornering.

The optimal total transversal and longitudinal stiffness values $K_{xt}$ and $K_{yt}$ are comprised in the following ranges:

$K_{xt}$=2300÷2500 N/mm $K_{yt}$=2400÷2600 N/mm.

The arrangement of transversal stiffness of the tread is additionally controlled by imposing that the ratio between total stiffness in the transversal direction $K_{yt}$ and total stiffness in the longitudinal direction $K_{xt}$ of the portion of tread in the contact area is within the following range:

$K_y/K_x$=0.98÷1.05.

This allows to optimize the performance of the tread for comfort/noise and handling at the same time.

In particular, tread 1 in FIGS. 1 and 2—identified by the marking TREAD C—has the following stiffness values $K_{xt}$ and $K_{yt}$:

$K_{xt}$=2345 N/mm $K_{yt}$=2412 N/mm.

And the ratio between its stiffness values $K_{yt}$ and $K_{xt}$ has the following value:

$K_{yt}/K_{xt}$=1.03.

These values were calculated with a modulus G=1, a contact area with dimensions as illustrated in FIG. 2, a vertical load Q=268 kg (2680 N) and an inflation pressure of 2.2 bar.

In practice, a preferred tread according to this invention has an arrangement of full and empty cells which is substantially uniform and equal throughout the contact areas along the circumferential development of the tread. In this way, the stiffness values in the longitudinal direction and in the transversal direction of all the contact areas are substantially equal and—during the rolling of said tire—longitudinal and transversal forces of constant values are transmitted to the hub, thus optimizing comfort, noise and handling.

What is claimed is:

1. A method for determining preselected performance characteristics of a tread of a tire, comprising ride comfort, noise, and handling; wherein a longitudinal direction, a transversal direction, and a vertical direction are associated with the tread; wherein the tread has a preselected thickness and a preselected circumferential development; wherein the tread comprises a preselected rubber compound and blocks and grooves; and wherein each portion of the tread in contact with a road surface comprises a contact area; comprising the steps of:

a) dividing the tread into a 3-D grid of full cells and empty cells of preselected dimensions;

b) identifying piles of the cells in the grid, each pile of cells having a base area equal to that of a cell and a height equal to the thickness of the tread, the piles of cells being full, partially full, or empty;

c) dividing each contact area into longitudinal and transversal strips of piles of cells, with preselected dimensions in the transversal and longitudinal directions;

d) counting a number of consecutive piles of full cells delimited by two piles of cells which are either partially full or empty, one preceding, the other following the consecutive piles of full cells in each strip;

e) associating a longitudinal or transversal stiffness value with each strip of piles of cells by means of a first linear relationship:

$K=m\times n$ where K is the stiffness value, n is the number of consecutive piles of full cells, and m is a first angular coefficient determined by means of a second linear relationship:

$m=mm\times i+c$ where mm is a second angular coefficient, i is a total number of empty cells present in the two piles of cells which are either partially full or empty delimiting the consecutive piles of full cells, and c is a constant, the second angular coefficient and constant both depending on the number n of consecutive piles of full cells;

f) assigning a preselected deformation state to each longitudinal and transversal strip of piles of cells;

g) determining at least one single force, associated with each strip of piles of cells and acting in the longitudinal or transversal direction by means of the stiffness value and the deformation state;

h) determining at least one total force associated with each contact area and acting in the longitudinal or transversal direction by summing all the single forces associated with all the longitudinal and transversal strips of piles of cells of the contact area, the total force representing at least one of the performance characteristics;

i) determining a pattern of the total forces associated with all the contact areas along the circumferential development of the tread; and j) analyzing the pattern of total forces to evaluate whether the total forces assume values that optimize at least one preselected performance characteristic of the tread.

2. The method of claim 1, wherein:

in step c), each contact area is divided into transversal strips of piles of cells with dimensions dx ly h, where dx is the length of a cell in the longitudinal direction, ly is the width of the strip in the transversal direction, measured in a preselected position in the longitudinal direction and delimited by portions of a contour line of the contact area, and h is the thickness of the tread;

in step e), a transversal stiffness value is associated with each transversal strip of piles of cells;

in step g), a single transversal force is associated with each transversal strip;

in step h), a total transversal force is associated with each contact area;

in step i), a pattern of the total transversal forces is obtained for the entire circumferential development of the tread; and in step j), values assumed by the total transversal forces are evaluated to check whether they have a mean value higher than a preselected limit and a variance lower than a preselected limit to optimize the tread with reference to handling.

3. The method of claim 1, wherein:

in step c), each contact are,a is divided into longitudinal strips of piles of cells with dimensions dy lx h, where dy is the width of a cell in the transversal direction, lx is the length of the strip in the longitudinal direction, measured in a preselected position in the transversal direction and delimited by portions of a contour line of the contact area, and h is the thickness of the tread;

in step e), a longitudinal stiffness value is associated with each longitudinal strip of piles of cells;

in step g), a single longitudinal force is associated with each longitudinal strip;

in step h), a total longitudinal force is associated with each contact area;

in step i), a pattern of the total longitudinal forces is obtained for the entire circumferential development of the tread; and in step j), values assumed by the total longitudinal forces are evaluated to check whether they have a mean value and variance lower than preselected limits to minimize the noise output by the tread and optimize ride comfort.

4. The method of claim 2, further comprising the step of:

k) associating a total transversal stiffness value to each contact area by summing the transversal stiffness values associated with all transversal strips in the contact area.

5. The method of claim 3, further comprising the step of:

k) associating a total longitudinal stiffness value to each contact area by summing the longitudinal stiffness values associated with all longitudinal strips in the contact area.

6. The method of claim 4, wherein the total transversal stiffness values are between 2,400 N/mm and 2,600 N/mm.

7. The method of claim 5, wherein the total longitudinal stiffness values are between 2,300 N/mm and 2,500 N/mm.

8. The method of claim 1, wherein:

in step c), each contact area is divided into transversal strips of piles of cells with dimensions dx ly h, where dx is the length of a cell in the longitudinal direction, ly is the width of the strip in the transversal direction, measured in a preselected position in the longitudinal direction and delimited by portions of a contour line of the contact area, and h is the thickness of the tread;

in step e), a transversal stiffness value is associated with each transversal strip of piles of cells;

in step g), a single transversal force is associated with each transversal strip;

in step h), a total transversal force is associated with each contact area;

in step i), a pattern of the total transversal forces is obtained for the entire circumferential development of the tread;

in step j), values assumed by the total transversal forces are evaluated to check whether they have a mean value higher than a preselected limit and a variance lower than a preselected limit to optimize the tread with reference to handling; and wherein:

in step c), each contact area is divided into longitudinal strips of piles of cells with dimensions dy lx h, where dy is the width of a cell in the transversal direction, lx is the length of the strip in the longitudinal direction, measured in a preselected position in the transversal direction and delimited by portions of a contour line of the contact area, and h is the thickness of the tread;

in step e), a longitudinal stiffness value is associated with each longitudinal strip of piles of cells;

in step g), a single longitudinal force is associated with each longitudinal strip;

in step h), a total longitudinal force is associated with each contact area;

in step i), a pattern of the total longitudinal forces is obtained for the entire circumferential development of the tread; and in step j), values assumed by the total longitudinal forces are evaluated to check whether they have a mean value and variance lower than preselected limits to minimize the noise output by the tread and optimize ride comfort.

9. The method of claim 8, further comprising the steps of:

k) associating a total transversal stiffness value to each contact area by summing the transversal stiffness values associated with all transversal strips in the contact area; and j) associating a total longitudinal stiffness value to each contact area by summing the longitudinal stiffness values associated with all longitudinal strips in the contact area.

10. The method of claim 9, wherein the total longitudinal stiffness values are between 2,300 N/mm and 2,500 N/mm, and the total transversal stiffness values are between 2,400 N/mm and 2,600 N/mm.

11. The method of claim 9, wherein a ratio of the total transversal stiffness values to the total longitudinal stiffness values is between 0.98 and 1.05.

* * * * *

UNITED STATES PATENT AND TRADEMARK OFFICE
CERTIFICATE OF CORRECTION

PATENT NO. : 6,697,772 B2
DATED : February 24, 2004
INVENTOR(S) : Federico Mancosu et al.

It is certified that error appears in the above-identified patent and that said Letters Patent is hereby corrected as shown below:

Column 13,
Line 17, "are,a" should read -- area --.

Signed and Sealed this

Twelfth Day of October, 2004

JON W. DUDAS
*Director of the United States Patent and Trademark Office*